United States Patent
Wu et al.

(10) Patent No.: US 10,011,222 B1
(45) Date of Patent: Jul. 3, 2018

(54) ON TOUCH SELF-LIGHT GROWTH STEERING WHEEL

(71) Applicant: Toyota Motor Engineering & Manufacturing North America, Inc., Erlanger, KY (US)

(72) Inventors: Songtao Wu, Ann Arbor, MI (US); Chi-Ming Wang, Ann Arbor, MI (US); Khoa Vo, Superior Township, MI (US); Debasish Banerjee, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/584,222

(22) Filed: May 2, 2017

(51) Int. Cl.
| | |
|---|---|
| *B60Q 1/00* | (2006.01) |
| *F21V 21/28* | (2006.01) |
| *F21V 21/29* | (2006.01) |
| *B60Q 3/283* | (2017.01) |
| *F21S 9/04* | (2006.01) |
| *F21V 23/06* | (2006.01) |
| *H02N 1/04* | (2006.01) |
| *B60Q 3/80* | (2017.01) |
| *F21Y 113/10* | (2016.01) |
| *F21Y 115/10* | (2016.01) |
| *F21W 106/00* | (2018.01) |

(52) U.S. Cl.
CPC .............. *B60Q 3/283* (2017.02); *B60Q 3/80* (2017.02); *F21S 9/04* (2013.01); *F21V 23/06* (2013.01); *H02N 1/04* (2013.01); *F21W 2106/00* (2018.01); *F21Y 2113/10* (2016.08); *F21Y 2115/10* (2016.08)

(58) Field of Classification Search
CPC . B60Q 3/283; B60Q 3/80; F21V 23/06; F21S 9/04; H02N 1/04; F21W 2106/00; F21Y 2115/10; F21Y 2113/10
USPC .......................................................... 362/36
See application file for complete search history.

(56) References Cited

U.S. PATENT DOCUMENTS

| | | | | |
|---|---|---|---|---|
| 9,873,446 B2 * | 1/2018 | Gardner | ................. | B62D 1/046 |
| 2007/0153535 A1 * | 7/2007 | Bostick | .................... | B60Q 9/00 |
| | | | | 362/488 |
| 2015/0375677 A1 * | 12/2015 | Salter | ...................... | B62D 1/06 |
| | | | | 362/510 |

(Continued)

*Primary Examiner* — Donald Raleigh
(74) *Attorney, Agent, or Firm* — Snell & Wilmer LLP

(57) ABSTRACT

A system includes a shell at least partially formed in a shape of a steering wheel and having a first layer and a second layer spaced apart from one another. The system further includes an LED coupled to the shell or the steering wheel. The system also includes a positive triboelectric material coupled to the first layer of the shell and that loses electrons in response to friction. The system further includes a negative triboelectric material coupled to the second layer of the shell and that gains electrons in response to friction. The system further includes an electrical connector coupled to the LED and at least one of the positive triboelectric material or the negative triboelectric material. Current flows through the electrical connector to illuminate the LED when force is being applied to the shell causing the positive triboelectric material to contact the negative triboelectric material.

20 Claims, 8 Drawing Sheets

(56) References Cited

U.S. PATENT DOCUMENTS

2016/0025281 A1* 1/2016 Gardner .................. B62D 1/06
362/516
2017/0106786 A1* 4/2017 Ebina ...................... B60Q 3/80

* cited by examiner

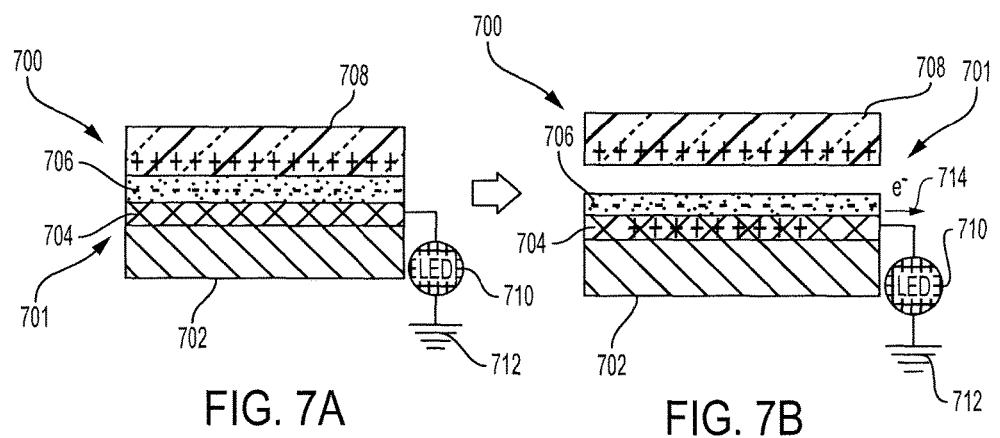
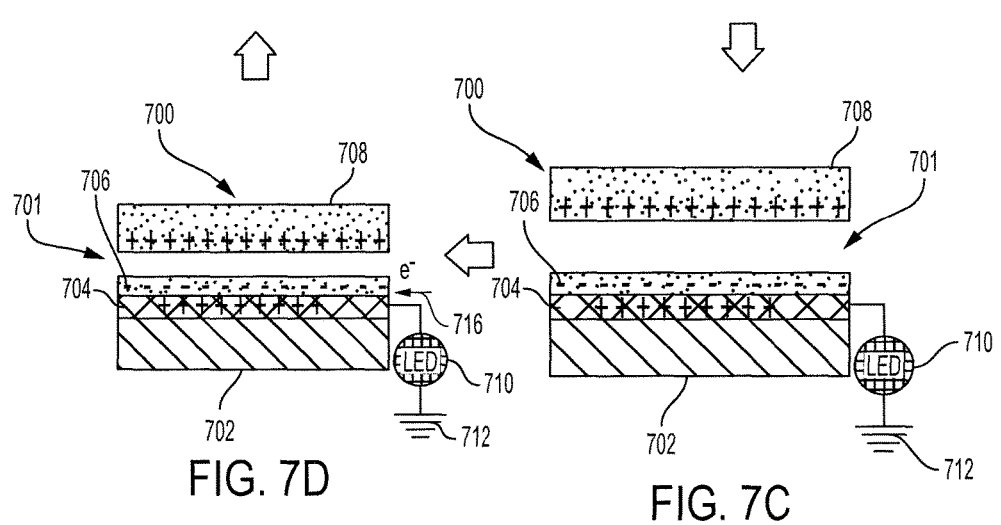
FIG. 7A  FIG. 7B  FIG. 7C  FIG. 7D

ON TOUCH SELF-LIGHT GROWTH STEERING WHEEL

BACKGROUND

1. Field

The present disclosure relates to systems and methods for illuminating a steering wheel using a triboelectric generator that generates electricity in response to touch.

2. Description of the Related Art

As society continues to move away from the use of fossil fuels, multiple renewable energy sources are being discovered. Some of these renewable energy sources include solar power, wind power, regenerative braking in vehicles, and the like. A renewable energy source that is gaining in popularity is triboelectric energy generation. Triboelectric energy is generated by electrons transferring from one material to another material when friction occurs. Static electricity is a form of triboelectric energy.

Some materials have a tendency to gain electrons in response to friction and may be referred to as negative triboelectric materials because they gain a negative charge as they gain electrons. Other materials have a tendency to lose electrons in response to friction and may be referred to as positive triboelectric materials because they gain a positive charge as they lose electrons. The transfer of electrons between materials may result in a voltage forming across the materials. If this voltage is applied to a load, the charge may flow through the load as current, thus powering the load.

To date, very few uses of triboelectric energy generation have been developed. Due to the relatively unlimited sources of triboelectric energy, discovery of additional applications and uses of such triboelectric energy is desirable.

SUMMARY

Described herein is a system for illuminating a steering wheel of a vehicle. The system includes a shell at least partially formed in a shape of the steering wheel and having a first layer and a second layer spaced apart from one another. The system further includes a light emitting diode (LED) embedded within or attached to the shell or the steering wheel. The system also includes a positive triboelectric material coupled to the first layer of the shell and having a tendency to lose electrons in response to friction. The system further includes a negative triboelectric material coupled to the second layer of the shell and having a tendency to gain electrons in response to friction. The system further includes an electrical connector coupled to the LED and at least one of the positive triboelectric material or the negative triboelectric material. Current flows through the electrical connector to illuminate the LED in response to force being applied to the shell causing the positive triboelectric material to contact the negative triboelectric material.

Also described is a system for illuminating a steering wheel of a vehicle. The system includes a shell at least partially formed in a shape of the steering wheel and having a first layer and a second layer spaced apart from one another. The system also includes a positive triboelectric material coupled to the first layer of the shell and designed to lose electrons in response to friction. The system also includes a negative triboelectric material coupled to the second layer of the shell and designed to gain electrons in response to friction. The system also includes an electrical connector coupled to at least one of the positive triboelectric material or the negative triboelectric material such that current flows through the electrical connector to an electronic device in response to force being applied to the shell causing the positive triboelectric material to contact the negative triboelectric material.

Also described is a system for illuminating a steering wheel of a vehicle. The system includes a base substrate that forms a portion of the steering wheel or a portion of an annular steering wheel cover for the steering wheel. The system further includes a light emitting diode (LED) embedded within or attached to the base substrate. The system further includes a conductive electrode attached to the base substrate. The system further includes a negative triboelectric material in contact with the conductive electrode and having a tendency to gain electrons in response to friction. The system further includes an electrical connector coupled to the LED and the conductive electrode such that current flows from the negative triboelectric material through the electrical connector to illuminate the LED in response to contact between the negative triboelectric material and a positive triboelectric material.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 7A-7D are drawings illustrating operation of a self-illuminating package having a triboelectric generator with a single triboelectric layer designed to generate electricity in response to friction with an external surface according to an embodiment of the present invention;

DETAILED DESCRIPTION

The present disclosure describes a system for illuminating a steering wheel of a vehicle when contact is made with the steering wheel. The system uses a triboelectric generator that converts contact or friction between two materials into electricity. The system includes an LED that receives the electricity from the triboelectric generator. A first embodiment includes two triboelectric materials attached to an elastic shell in such a manner that the triboelectric materials are spaced apart from each other. As force is applied to the shell, the two triboelectric materials may contact each other, generating electricity. A second embodiment includes a single triboelectric material and takes advantage of the fact that a human hand has triboelectric properties. As a hand contacts the triboelectric material, friction between the hand and the material results in electricity generation. The generated electricity may be used to power an LED located on the steering wheel.

The systems provide a novel application for use of triboelectric generated energy. Use of triboelectric generated energy is advantageous because it is a renewable energy source and, thus, the LED requires no external power to operate. Due to the renewable generation of power, the triboelectric generator advantageously requires no power management circuit to operate. One embodiment of the triboelectric generator includes an elastomer shell which advantageously increases output power and duration of the triboelectric generator. The other embodiment of the triboelectric generator includes only an electrode and a single triboelectric material, beneficially resulting in a device that is relatively inexpensive and easy to fabricate. Furthermore, because two embodiments are disclosed, a manufacturer may advantageously select whichever embodiment is best suited for a particular purpose.

Figure 1:
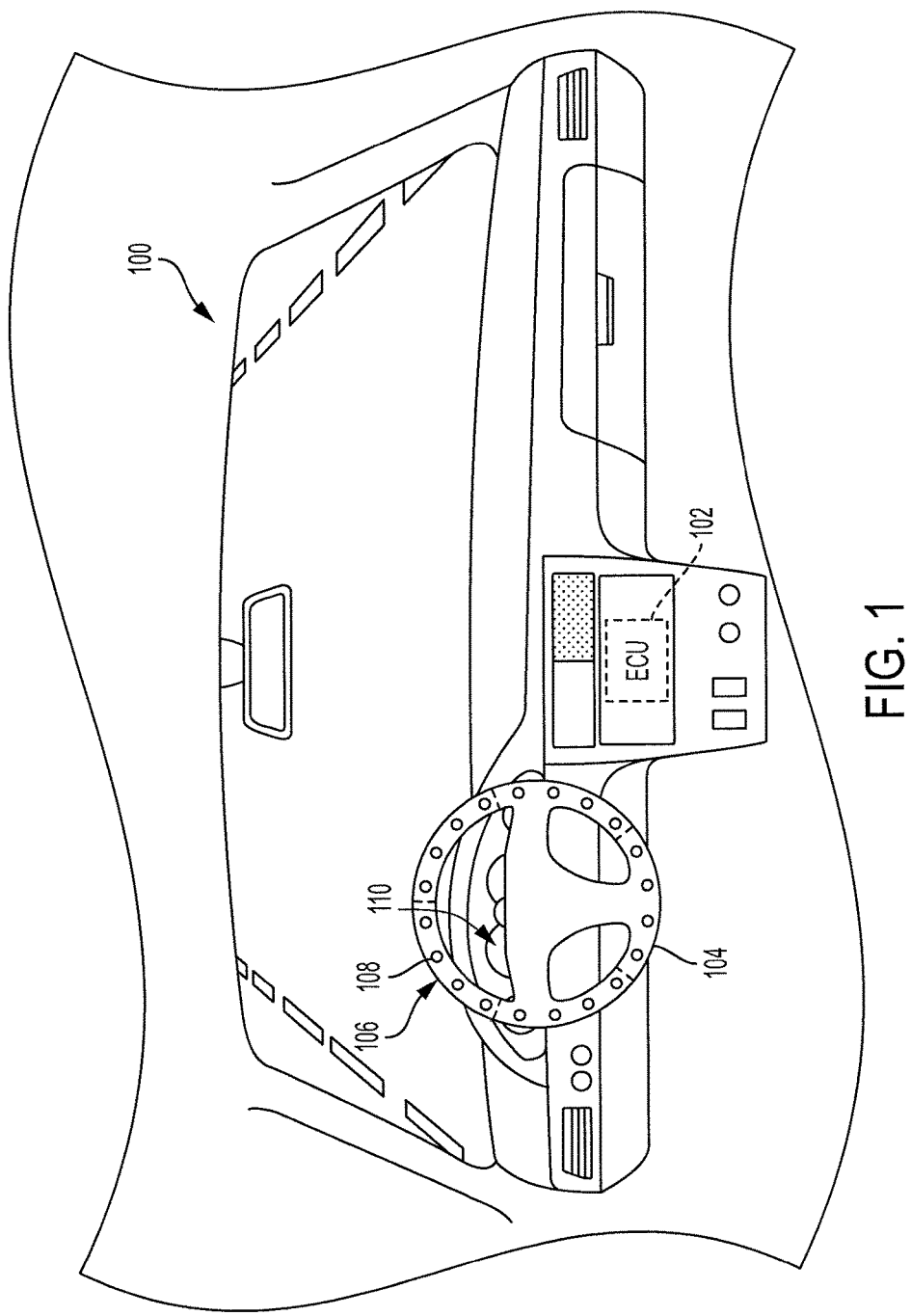
FIG. 1 is a drawing illustrating an interior of a vehicle having a steering wheel with a plurality of self-illuminating packages according to an embodiment of the present invention.

Turning to FIG. 1, an interior of a vehicle 100 is shown. The vehicle may be a hybrid vehicle, a conventional gas powered vehicle, an electric vehicle, or any other type of vehicle. In that regard, the vehicle may be powered by one or more of a gasoline engine, a combination of a battery and a motor generator, a fuel cell, or the like.

The vehicle 100 may further include an electronic control unit (ECU) 102. The ECU 102 may include one or more controller or processor designed to control operation of the vehicle 100. For example, the ECU 102 may control operation of an engine or motor generator, may control braking operation, and the like.

The vehicle 100 may further include a steering wheel 104. The steering wheel 104 may be used to maneuver the vehicle 100 along a ground surface. The steering wheel 104 may include a plurality of self-illuminating packages 106. Each of the self-illuminating packages 106 may include a plurality of LEDs 108. Each of the plurality of self-illuminating packages 106 may be spaced about a circumference of the steering wheel 104.

The self-illuminating packages 106 may include a triboelectric generator that is designed to power the LEDs 108 in response to contact or force, such as in response to a driver gripping or tapping one of the self-illuminating packages 106. As the force is applied to the self-illuminating package 106, the triboelectric generator may generate power to cause the LEDs 108 of the self-illuminating package 106 to illuminate. In that regard, only the LEDs 108 that correspond to the contacted self-illuminating package 106 are illuminated and the remaining LEDs 108 on the steering wheel 104 remain off. For example, LEDs 108 near the point of contact with the steering wheel 104 may illuminate without power from any source other than the triboelectric generator. The shape, locations about the steering wheel 104, orientation of the LEDs 108, and the like may be selected based on design preferences.

In some embodiments, the triboelectric generator may generate power used to power a component other than an LED, or may perform a different function. For example, the triboelectric generator may generate power usable to power a digital display. As another example, a sensor may be coupled to the output of the triboelectric generator and monitor the output. Based on the output power, a processor or ECU coupled to the sensor may be capable of determining relative pressure applied to the steering wheel by a driver. Such pressure may be further used by the processor or ECU as an indicator of a state of the driver, such as whether the driver is tired, intoxicated, or the like.

In some embodiments, the self-illuminating packages 106 may be directly built into the steering wheel 104 or may be attached to the steering wheel 104. In some embodiments, the self-illuminating packages 106 may be included on a steering wheel cover that is positioned over the steering wheel 104.

The self-illuminating packages 106 may be designed with certain criteria in mind. For example, if the self-illuminating package 106 is incorporated in a steering wheel cover, it is desirable for the steering wheel cover to be adaptable to one or more steering wheel, in a similar manner as conventional steering wheel covers. Additionally, it is desirable for the triboelectric generator included in the self-illuminating package 106 to be self-sufficient, i.e., it is undesirable for the self-illuminating package 106 to receive power other than from the triboelectric generator. It is further desirable for the triboelectric generator to be capable of harvesting the received mechanical energy at a relatively high efficiency and to deliver relatively long periods of output power to maintain the LEDs 108 in an on state for a relatively long period of time. Additionally, it is undesirable for the self-illuminating package 106 to include a bulky power management circuit. Also, it is desirable for the fabrication process of the triboelectric generator to be relatively simple and relatively low cost. The self-illuminating packages 106 described herein satisfy these criteria.

In some embodiments, the self-illuminating packages 106 may be coupled to the ECU 102 and may be at least partially controllable by the ECU 102. For example, the vehicle 100 may include a remaining power gauge 110 that displays an amount of remaining power of a power source of the vehicle 100. For example, the remaining power gauge 110 may display a remaining quantity of fuel, a remaining state of charge (SOC) of a battery, or the like.

The ECU 102 may transmit a first signal (which may include a lack of signal or a logical "0") to one or more self-illuminating package 106 when the amount of remaining power is at or above a threshold amount of power. The threshold amount of power may correspond to a power level at which it is deemed appropriate to inform a driver that the vehicle should be refueled (i.e., such as when the remaining amount of fuel can be used to travel 50 miles or less, 30 miles or less, or the like). The threshold amount of power may be set by the vehicle manufacturer. In response to receiving the first signal, the self-illuminating package 106 may cause the LEDs 108 to illuminate at a first color (such as green) when the self-illuminating package 106 receives sufficient force to power the LEDs 108.

The ECU 102 may transmit a second signal to the one or more self-illuminating package 106 when the amount of remaining power is at or below the threshold amount of power. In response to receiving the second signal, the self-illuminating package 106 may cause the LEDs 1082 illuminate at a second color (such as red) that is different than the first color when the self-illuminating package 106 receives sufficient force to power the LEDs 108. In that regard, a driver may be notified when the remaining power of the vehicle 100 reaches or drops below the threshold amount of power.

Figure 2:
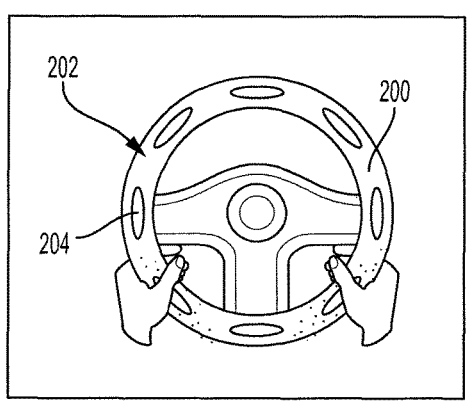
FIG. 2 is a drawing of a steering wheel having an annular steering wheel cover with a plurality of self-illuminating packages according to an embodiment of the present invention.

Turning now to FIG. 2, another steering wheel 202 is shown. The steering wheel 202 includes an annular steering wheel cover 200 removably positioned about the steering wheel 202. In that regard, the steering wheel cover 200 may be sold separate from the steering wheel 202 and may be usable on multiple steering wheels. The annular steering wheel cover 200 may include a plurality of self-illuminating packages 204. The self-illuminating packages 204 may each include a triboelectric generator and one or more LED. Each of the self-illuminating packages 204 may illuminate in response to force being applied to the particular self-illuminating package. The self-illuminating packages 204 may be integrated into a predesigned cavity of the annular steering wheel cover 200 and may power the one or more LED without external electricity.

Referring to FIGS. 3A through 3E, operation of a self-illuminating package 300 is shown. In particular and referring to FIG. 3A, a cross-sectional view of the self-illuminating package 300 illustrates that the self-illuminating package 300 includes a shell 302. The shell 302 may include a first layer 304 and a second layer 306. The first layer 304 and the second layer 306 may be separated by a distance 307. The distance 307 may be, for example, between 0.01 centimeter (0.01 cm, 0.0039 inches) and 3 cm (1.2 inches), between 0.02 cm (0.0079 inches) and 2 cm (0.79 inches), between 0.1 cm (0.039 inches) and 0.5 cm (0.20 inches), or the like.

A size of the cavity (in all directions) defined between the first layer 304 and the second layer 306 may be selected based on desired properties. For example, the size of the cavity may be selected based on a desirable amount of contact between materials, an amount of available space in the steering wheel or steering wheel cover, a quantity of self-illuminating packages desired to be incorporated in the steering wheel or steering wheel cover, or the like.

One or more of the first layer 304 or the second layer 306 may include an elastomer material. The elastomer material may include, for example, silicone, fluorosilicone, natural rubber, a polyurethane, a polybutadiene, a neoprene, or the like. In that regard, as pressure is applied to the first layer 304 towards the second layer 306 (or vice versa), the elastic properties of the elastomer material allows the first layer 304 to approach the second layer 306, reducing the distance 307.

The self-illuminating package 300 further includes a triboelectric generator 301 and an LED 308. The triboelectric generator 301 converts mechanical energy (such as friction) into electrical energy for powering the LEDs 308.

In particular, the triboelectric generator 301 includes a positive triboelectric material 310 and a negative triboelectric material 312. The positive triboelectric material 310 has a tendency to lose electrons (i.e., acquire a positive charge) in response to friction with another material, especially in response to friction with a negative triboelectric material. The negative triboelectric material 312 has a tendency to gain electrons (i.e., acquire a negative charge) in response to friction with another material, especially in response to friction with a positive triboelectric material.

Figure 3A:
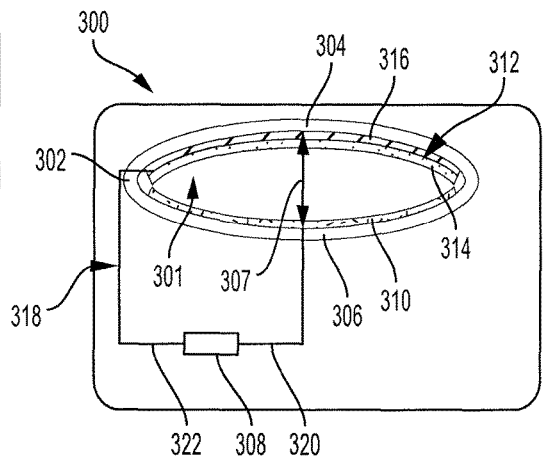
FIGS. 3A-3E are drawings illustrating operation of a self-illuminating package having a triboelectric generator with an elastomer shell and triboelectric materials coupled to an LED according to an embodiment of the present invention.

As shown in FIG. 3A, the negative triboelectric material 312 is located above the positive triboelectric material 310. The negative triboelectric material 312 may be located above or below the positive triboelectric material 312 without departing from the scope of the present disclosure. In some embodiments, the material of one or more of the first layer. 304 or the second layer 306 of the shell 302 may have negative triboelectric properties or may have positive triboelectric properties.

The positive triboelectric material 310 may include one or more material such as aluminum, silk, lead, nylon, glass, or the like. The negative triboelectric material 312 may include one or more of fluorinated ethylene propylene (FEP), poly (4,4'-oxydiphenylene-pyromellitimide) (available under the tradename Kapton®), polytetrafluoroethylene (PTFE, available under the tradename Teflon™), nylon, polydimethylsiloxane (PDMS), copper, gold, nickel, silver, brass, platinum, or the like.

In some embodiments, the negative triboelectric material 312 may include a first negative triboelectric material 314 and a second negative triboelectric material 316. The second negative triboelectric material 316 may be located between the first layer 304 and the first negative triboelectric material 314. In some embodiments, the first negative triboelectric material 314 may have stronger negative properties than the second negative triboelectric material 316 (i.e., the first negative triboelectric material 314 has a tendency to gain more electrons than the second negative triboelectric material 316 in response to friction). For example, the first negative triboelectric material 314 may include FEP and the second triboelectric material 316 may include gold.

In some embodiments, the first negative triboelectric material 314 may be an insulator (having a tendency to not conduct electricity) and the second negative triboelectric material 316 may be a conductor (having a tendency to conduct electricity). Many nonconductive negative triboelectric materials have stronger negative triboelectric properties than many conductive negative triboelectric materials. In that regard, use of the first negative triboelectric material 314 may provide electricity with a relatively large amplitude, and use of the second negative triboelectric material 316 may facilitate conduction of the electricity generated by the first negative triboelectric material 314.

In a particular embodiment, the first layer 304 and the second layer 306 of the shell 302 may include an elastomer, the positive triboelectric material 310 may include aluminum, the first negative triboelectric material 314 may include FEP, and the second negative triboelectric material 316 may include gold.

The triboelectric generator 301 (at least one of the positive triboelectric material 310, the first negative triboelectric material 314, or the second negative triboelectric material 316) may be connected to the LEDs 308 via an electrical connector 318. For example, the electrical connector 318 may include one or more wire. As shown in FIG. 3A, the electrical connector 318 may include a first wire 320 coupled to the positive triboelectric material 310 and coupled to a terminal of the LED 308. The electrical connector 318 may also include a second wire 322 coupled to the second negative triboelectric material 316 and another terminal of the LED 308.

In some embodiments, the electrical connector 318 may include only a single wire coupled to the LED and either of the positive triboelectric material 310 or the negative triboelectric material 312. In these embodiments, a second terminal of the LED may be connected to a ground.

Figure 3B:
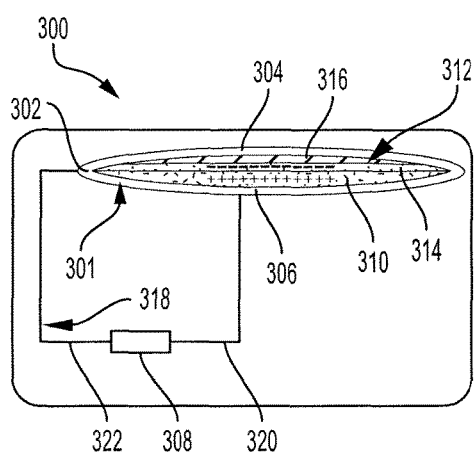

The self-illuminating package 300 shown in FIG. 3A is in an initial state prior to any force applied to the shell 302. Referring to FIG. 3B, the self-illuminating package 300 is shown with force being applied on the first layer 304 towards the second layer 306. As shown, this contact causes the positive triboelectric material 310 to contact the first negative triboelectric material 314. In response to this contact, the positive triboelectric material 310 may lose electrons that are gained by the negative triboelectric material 312. Accordingly, the positive triboelectric material 310 may gain a positive charge and the negative triboelectric material 312 may gain a negative charge.

Figure 3C:
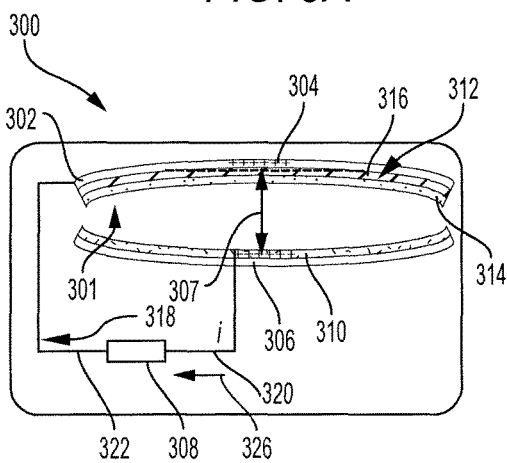

Turning to FIG. 3C, as the force applied to the first layer 304 is released, the elasticity of the shell 302 allows the first layer 304 to separate from the second layer 306. As the separation occurs, the negative triboelectric material 312 retains its negative charge and the positive triboelectric material 310 retains its positive charge. As time goes on, the materials have a tendency to equalize. In that regard, the electrons gained by the negative triboelectric material 312 begin to travel towards the positive triboelectric material 310 as current 326. This current 326 travels through the LED 308, causing the LED 308 to illuminate. Simultaneously, the first layer 304 may lose electrons to the second negative triboelectric material 316, resulting in the first layer 304 obtaining a positive charge and the second negative triboelectric material 316 obtaining a negative charge.

Figure 3D:
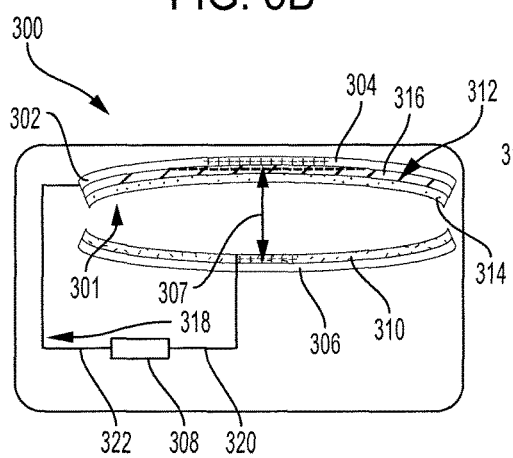

As the first layer 304 remains separated from the second layer 306, the first layer 304 retains its positive charge and the second negative layer 316 retains its negative charge as shown in FIG. 3D. At this point, the positive triboelectric material 310 has equalized meaning that it has regained the electrons lost during contact with the negative triboelectric material 312.

Figure 3E:
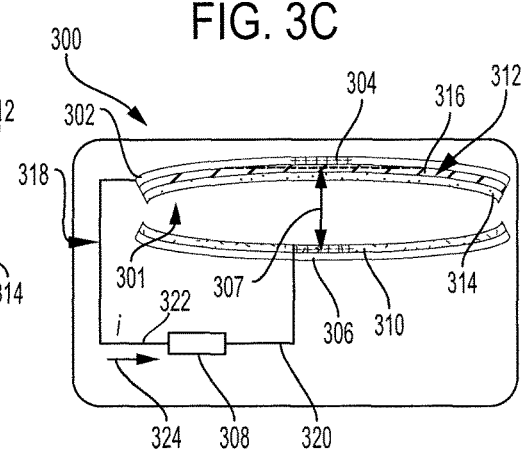

As force is again applied to the first layer 304 as shown in FIG. 3E, the positive triboelectric material 310 may again lose electrons, causing it to obtain a positive charge. Simultaneously, the negative triboelectric material 312 (and in some embodiments the first layer 304) may begin to gain electrons, resulting in current 324 again flowing through the LED 308. In response to receiving this current 324, the LED 308 may again illuminate.

Use of the elastomer material in the shell 302 provides advantages. The deformation and recovery of the elastomer material may induce contact and separation between the positive triboelectric material 310 and the negative triboelectric material 312. Furthermore, because the elastomer material may have negative triboelectric properties, contact between the elastomer material and a human hand (which has positive triboelectric properties) may generate additional electricity.

Additionally, use of the elastomer material may increase a time duration of electricity generated by the triboelectric generator 301. This may be particularly desirable because compression of the shell 302 may have a relatively low frequency (such as less than 5 hertz (Hz), resulting in relatively short-width peaks. By increasing the time duration of the peaks, use of the elastomer material allows the LED 308 to remain illuminated for a longer period of time. The width of the peaks may be further adjusted by tuning the stiffness of the elastomer material used in the shell 302.

Based on design choices of the self-illuminating package 300 (such as materials used for the triboelectric materials and the elastomer material), the self-illuminating package 300 may be capable of harvesting sufficient electricity to power the LED 308 through a variety of mechanical motions such as a user gripping the steering wheel, sliding his hands on the steering wheel, tapping the steering wheel, or the like.

Figure 4A:
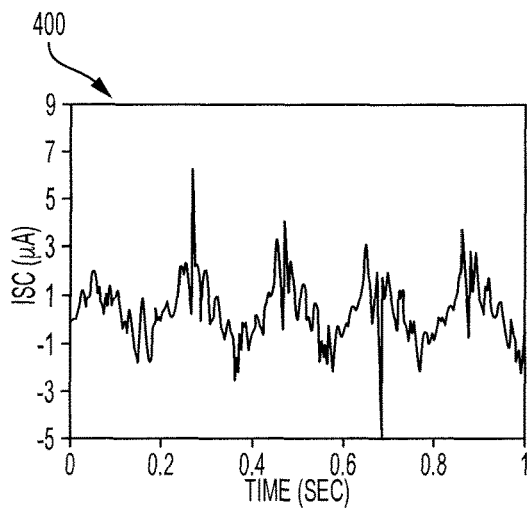
FIGS. 4A and 4B are graphs illustrating current and voltage output by the triboelectric generator of FIGS. 3A-3E according to an embodiment of the present invention.
Figure 4B:
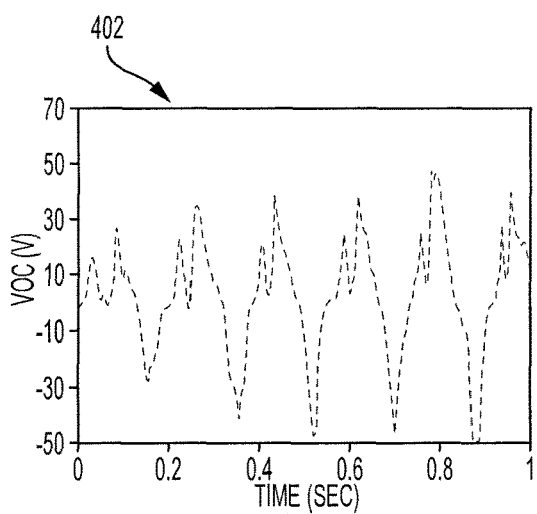

Turning to FIGS. 4A and 4B, a first graph 400 illustrates output current of the triboelectric generator 301 of FIG. 3A and a second graph 402 illustrates output voltage of the triboelectric generator 301 in response to a hand being wrapped around the steering wheel. As shown, the triboelectric generator 301 has been designed such that the output current and the output voltage resemble a sine wave. In particular, the triboelectric generator 301 includes PDMS in the shell 302, aluminum as the positive triboelectric material 310, FEP as the first negative triboelectric material 314, and gold as the second negative triboelectric material 316.

The current and voltage output by the triboelectric generator 301 have sufficiently large peak widths and can thus power the LED 308 for a relatively long period of time. Furthermore, the amplitude of the current and voltage output by the triboelectric generator 301 is sufficiently great that the triboelectric generator 301 may power up to 50 LEDs.

Figure 5:
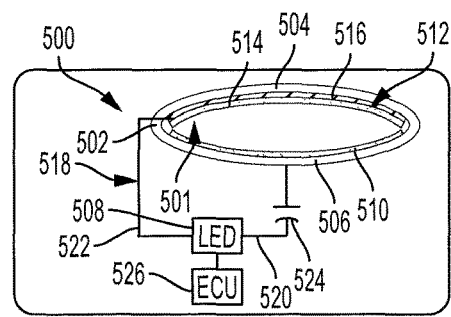
FIG. 5 is a drawing of a self-illuminating package having a capacitor coupled to a triboelectric generator for increasing an illumination time of an LED and having an electronic control unit (ECU) coupled to the LED for controlling a color output of the LED according to an embodiment of the present invention.

Referring now to FIG. 5, a cross-section of another self-illuminating package 500 is shown. The self-illuminating package 500 has similar features as the self-illuminating package 300 of FIG. 3A. In particular, the self-illuminating package 500 includes a shell 502 with a first layer 504 and a second layer 506. The self-illuminating package 500 further includes a triboelectric generator 501 coupled to an LED 508 and having a positive triboelectric material 510 and a negative triboelectric material 512. The negative triboelectric material 512 includes a first negative triboelectric material 514 and a second negative triboelectric material 516 located between the first layer 504 and the first negative triboelectric material 514.

The self-illuminating package 500 further includes a connector 518 that connects the LED 508 to the triboelectric generator 501. In particular, the connector 518 includes a first wire 520 coupled to the LED 508 and the positive triboelectric material 510, and further includes a second wire 522 coupled to the LED 508 and the second negative triboelectric material 516.

The self-illuminating package 500 includes a capacitor 524 located between the positive triboelectric material 510 and the LED 508. In some embodiments, the capacitor 524 may be located at any location between the LED 508 and the triboelectric generator 501 and, in some embodiments, the self-illuminating package 500 may include any quantity of capacitors.

As electricity travels from the triboelectric generator 501 to the LED 508, the capacitor 524 charges. As the electricity output of the triboelectric generator 501 decreases (i.e., the voltage and/or current decrease) the capacitor 524 discharges, providing additional electricity to the LED 508. As the voltage and/or current began ramping back up towards a peak, the capacitor 524 again charges, and later discharges as the voltage and/or current again decreases. In that regard, the charging and the discharging of the capacitor 524 results in the power being provided to the LED 508 for a longer period of time, causing the LED 508 to remain illuminated for a longer period of time.

The LED 508 of the self-illuminating package 500 may be coupled to an ECU 526 of a vehicle. In particular, the ECU 526 may be capable of transmitting a control signal to the LED 508. For example, the ECU 526 may determine an amount of remaining power of the vehicle, such as a remaining fuel level or a remaining SOC.

The ECU 526 may transmit a first signal to the LED 508 when the amount of remaining power is equal to or greater than a threshold amount of power. As a result, the LED 508 may illuminate a first color when sufficient force is applied to the shell 502 to cause the triboelectric generator 501 to generate electricity.

When the amount of remaining power is less than or equal to the threshold amount of power, the ECU 526 may transmit a second signal to the LED 508. In response to receiving the second signal, the LED 508 may illuminate a second color that is different than the first color when sufficient force is applied to the shell 502 to cause the triboelectric generator 501 to generate electricity. In that regard, the LED 508 may act as an indicator to provide a warning when the amount of remaining power is relatively low. In some embodiments, the LED 508 may act as an indicator for any other information determined by the ECU 526.

Figure 6A:
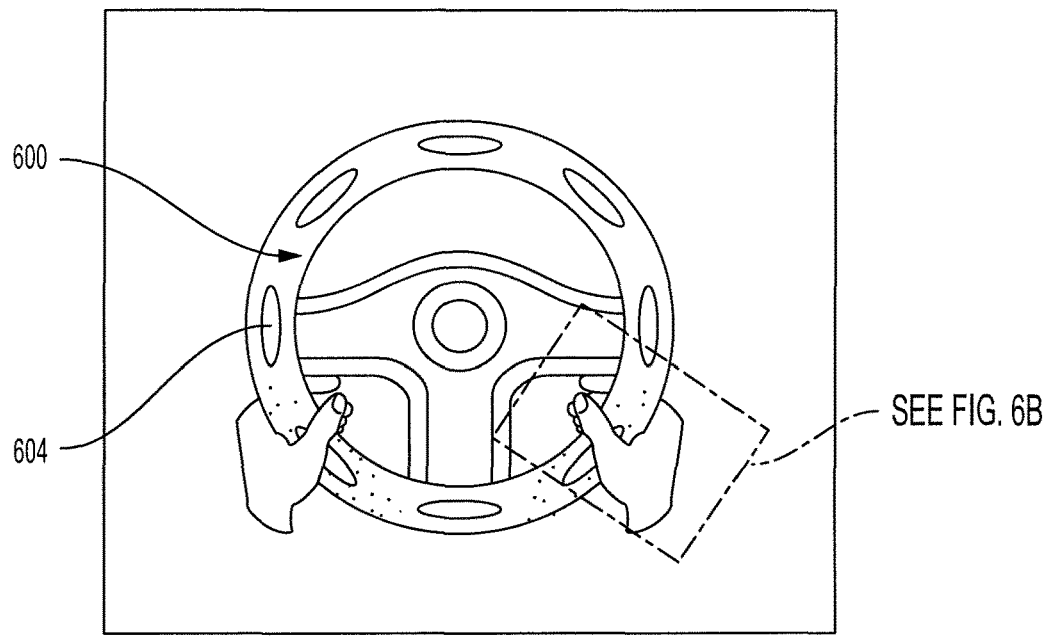
FIGS. 6A and 6B are drawings of a steering wheel having a plurality of self-illuminating packages according to an embodiment of the present invention.

Turning now to FIG. 6A, another steering wheel 600 may include a plurality of self-illuminating packages 604 embedded within the steering wheel 600. The self-illuminating packages 604 of the steering wheel 600 may function in a slightly different manner as the self-illuminating packages 204 of FIG. 2.

Figure 6B:
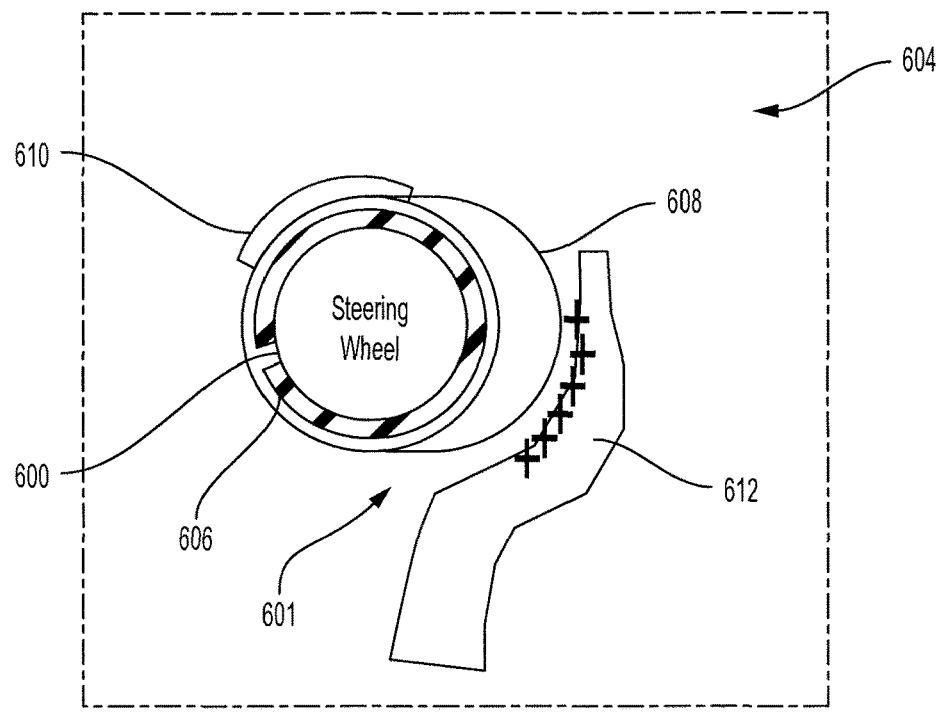

In particular and referring to FIG. 6B, a cross-section of the steering wheel 600 illustrates that the self-illuminating package 604 includes a triboelectric generator 601 and a plurality of LEDs 610. The triboelectric generator 601 may include a negative triboelectric material 608. The negative triboelectric material 608 may include any negative triboelectric material such as those mentioned above with reference to FIG. 3A. The triboelectric generator 601 may further include an electrode 606 positioned at least partially about the steering wheel 600 and located radially between the negative triboelectric material 608 and the steering wheel 600.

The triboelectric generator 601 takes advantage of the fact that a human hand 612 (including other materials such as cotton) has positive triboelectric properties. In that regard, when the human hand 612 contacts the negative triboelectric material 608, electrons may separate from the human hand 612 and travel to the negative triboelectric material 608. The moving electrons may pass through the LEDs 610, thus providing electricity to the LEDs 610 causing them to illuminate.

Referring to FIGS. 7A through 7D, operation of a triboelectric generator 701 is shown. The triboelectric generator 701 has similar properties as the triboelectric generator 601 of FIG. 6B.

In particular and referring to FIG. 7A, the triboelectric generator 701 is formed on a steering wheel 702. The triboelectric generator 701 includes an electrode 704 and a negative triboelectric material 706. The electrode 704 may include any conductive material. In various embodiments, aluminum may be desirable due to its relatively weak positive triboelectric properties (i.e., because aluminum has a tendency to lose relatively few electrons in response to friction). The electrode 704 may transfer electricity to an LED 710 that is also connected to a ground 712.

As shown in FIG. 7A, a hand 708 is in contact with the negative triboelectric layer 706. The contact between the hand 708 and the negative triboelectric layer 706 results in the hands 708 losing electrons to the negative triboelectric layer 706. In that regard, the hand 708 obtains a positive surface charge and the negative triboelectric layer 706 obtains a negative surface charge.

As the hand 708 is released from the negative triboelectric layer 706 as shown in FIG. 7B, the hand 708 remains positively charged and the negative triboelectric layer 706 remains negatively charged. In that regard, the electrons from the negative triboelectric layer 706 will tend to flow away from the negative triboelectric layer 706 through the electrode 704 and to the LED 710 as current 714. The electrons may then flow through the LED 710 to the ground 712, thus powering the LED 710 causing it to illuminate.

As the hand 708 remains separated from the negative triboelectric material 706 as shown in FIG. 7C, the hand 708 retains some of its positive charge and the negative triboelectric material 706 retains some of its negative charge.

As the hand 708 again approaches the negative triboelectric material 706 as shown in FIG. 7D, electrons may again travel from the hand 708 to the negative triboelectric material 706. This transfer of electrons may cause current 716 to again flow through the electrode 704 to the LED 710, causing the LED 710 to illuminate.

Referring to FIGS. 8A through 8F, output of the triboelectric generator 701 of FIG. 7A is shown for a variety of types of contact with the steering wheel 702. In particular and referring to FIGS. 8A and 8B, a first graph 800 illustrates current output by the triboelectric generator 701 and a second graph 802 illustrates voltage output by the triboelectric generator 701, both in response to the hand 708 wrapping around and gripping the steering wheel 702. As shown, the current and the voltage at least somewhat resemble a sine wave.

Figure 8A:
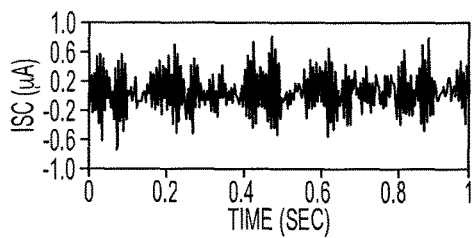
FIGS. 8A-8F are graphs illustrating current and voltage output by the triboelectric generator of FIGS. 7A-7D in response to various types of contact with a human hand according to an embodiment of the present invention.
Figure 8B:
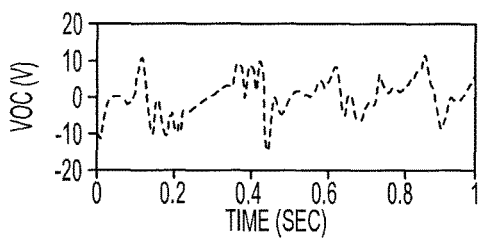
Figure 8C:
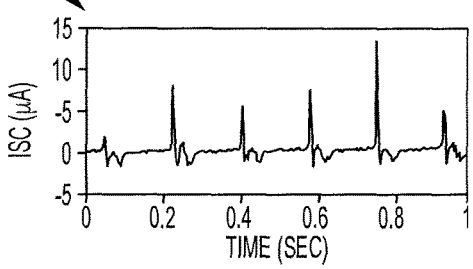
Figure 8D:
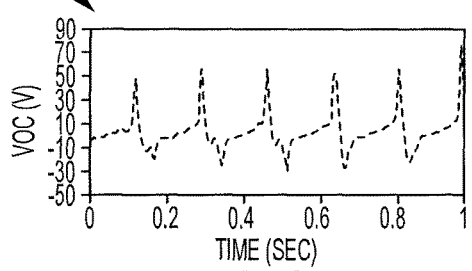

Referring to FIGS. 8C and 8D, a first graph 804 illustrates current output by the triboelectric generator 701 and a second graph 806 illustrates voltage output by the triboelectric generator 701, both in response to the hand 708 tapping the steering wheel 702. As shown, both the current and the voltage are output as peaks having a relatively small peak width.

Figure 8E:
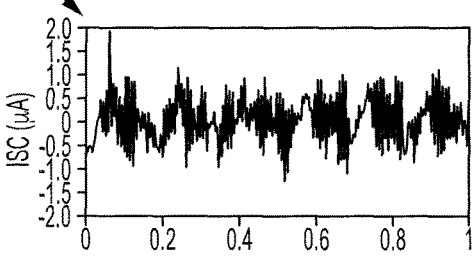
Figure 8F:
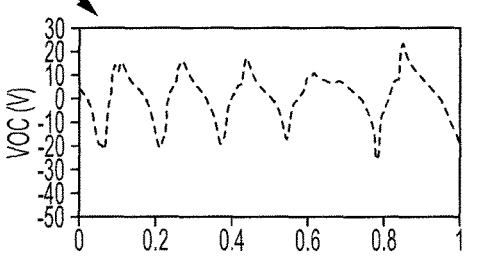

Referring to FIGS. 8E and 8F, a first graph 808 illustrates current output by the triboelectric generator 701 and a second graph 810 illustrates voltage output by the triboelectric generator 701, both in response to the hand 708 sliding circumferentially about the steering wheel 702. As shown, the additional friction generated by the sliding increases the peak width of the voltage and the current by a relatively large amount.

The triboelectric generator 701 may generate electricity even when additional material is present between the hand 708 and the negative triboelectric material 706. Referring to FIGS. 9A through 9F, output of the triboelectric generators 701 is shown for various situations where the hand 708 is wearing a cotton glove.

Figure 9A:
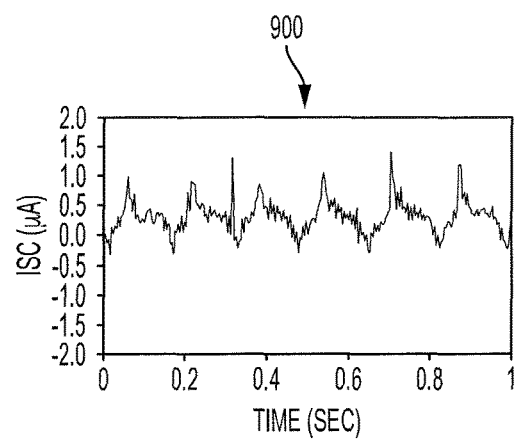
FIGS. 9A-9F are graphs illustrating current and voltage output by the triboelectric generator of 7A-7D in response to various types of contact with a hand wearing a cotton glove according to an embodiment of the present invention.
Figure 9B:
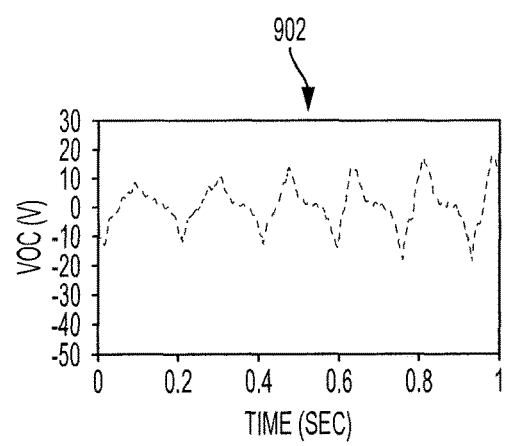

In particular and referring to FIGS. 9A and 9B, a first graph 900 illustrates current output by the triboelectric generator 701 and a second graph 902 illustrates voltage output by the triboelectric generator 701, both in response to the gloved hand wrapping around and gripping the steering wheel 702. As shown, the current and the voltage at least somewhat resemble a sine wave. Furthermore, although the amplitude of the current and the voltage are less than when no glove is used, the amount of current and voltage achieved by the triboelectric generator 701 when the gloved hand is used is sufficient to power multiple LEDs.

Figure 9C:
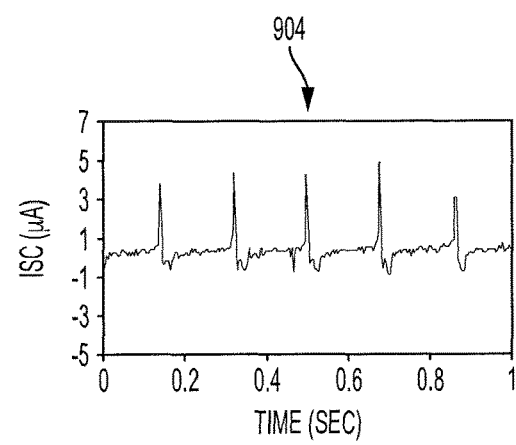
Figure 9D:
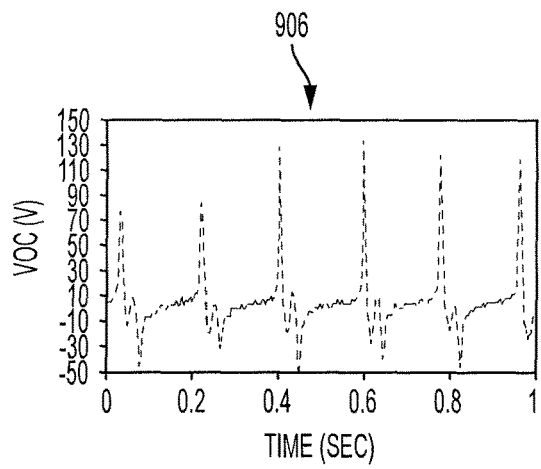

Referring to FIGS. 9C and 9D, a first graph 904 illustrates current output by the triboelectric generator 701 and a second graph 906 illustrates voltage output by the triboelectric generator 701, both in response to the gloved hand tapping the steering wheel 702. As shown, both the current and the voltage are output as peaks having a relatively small peak width. Furthermore, although the amplitude of the current and the voltage are less than when no glove is used, the amount of current and voltage achieved by the triboelectric generator 701 when the gloved hand is used is sufficient to power multiple LEDs.

Figure 9E:
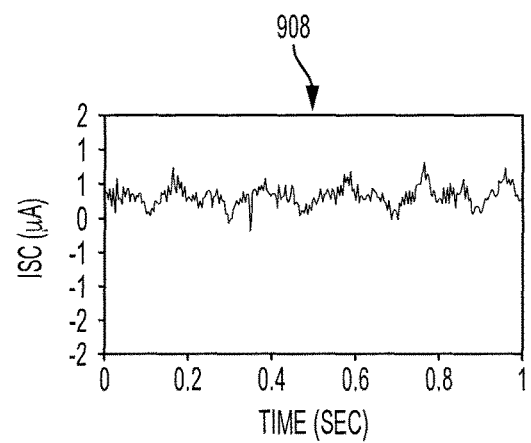
Figure 9F:
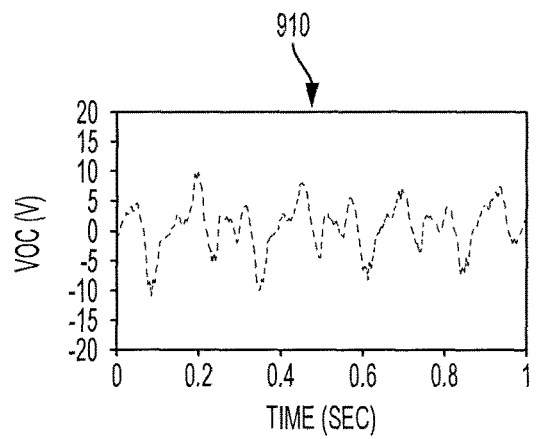

Referring to FIGS. 9E and 9F, a first graph 908 illustrates current output by the triboelectric generator 701 and a second graph 910 illustrates voltage output by the triboelectric generator 701, both in response to the gloved hand sliding circumferentially about the steering wheel 702. As shown, the additional friction generated by the sliding increases the peak width of the voltage and the current by a relatively large amount. Furthermore, although the amplitude of the current and the voltage are less than when no glove is used, the amount of current and voltage achieved by the triboelectric generator 701 when the gloved hand is used is sufficient to power multiple LEDs.

Where used throughout the detailed description and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for illuminating a steering wheel of a vehicle comprising:
   a shell at least partially formed in a shape of the steering wheel and having a first layer and a second layer spaced apart from one another;
   a light emitting diode (LED) embedded within or attached to the shell or the steering wheel;
   a positive triboelectric material coupled to the first layer of the shell and configured to lose electrons in response to friction;
   a negative triboelectric material coupled to the second layer of the shell and configured to gain electrons in response to friction; and
   an electrical connector coupled to the LED and at least one of the positive triboelectric material or the negative triboelectric material such that current flows through the electrical connector to illuminate the LED in response to force being applied to the shell causing the positive triboelectric material to contact the negative triboelectric material.

2. The system of claim 1 wherein at least one of the first layer of the shell or the second layer of the shell includes an elastomer material.

3. The system of claim 2 wherein the elastomer material includes at least one of silicone, fluorosilicone, natural rubber, polyurethane, polybutadiene, or neoprene.

4. The system of claim 1 wherein the electrical connector includes a first wire coupled to the LED and the positive triboelectric material and a second wire coupled to the LED and the negative triboelectric material.

5. The system of claim 1 wherein the shell is at least one of a portion of the steering wheel or defined by an annular steering wheel cover.

6. The system of claim 4 wherein:
   the shell, the LED, the positive triboelectric material, the negative triboelectric material, and the electrical connector form a first self-illuminating package; and
   at least one of the steering wheel or the annular steering wheel cover includes a plurality of self-illuminating packages including the first self-illuminating package spaced circumferentially about the steering wheel or the annular steering wheel cover.

7. The system of claim 1 further comprising a capacitor coupled between the LED and the at least one of the positive triboelectric material or the negative triboelectric material and configured to increase a time duration of power applied to the LED.

8. The system of claim 1 wherein the negative triboelectric material includes a first negative triboelectric material and a second negative triboelectric material located between the second layer of the shell and the first negative triboelectric material and configured to gain fewer electrons than the first negative triboelectric material in response to friction.

9. The system of claim 1 wherein a distance from the first layer of the shell to the second layer of the shell is between 0.02 centimeters (cm) and 2 cm.

10. The system of claim 1 wherein the negative triboelectric material includes at least one of fluorinated ethylene propylene, poly (4,4'-oxydiphenylene-pyromellitimide), polytetrafluoroethylene, or polydimethylsiloxane.

11. The system of claim 1 further comprising an electronic control unit (ECU) coupled to the LED and configured to transmit a control signal to the LED to cause the LED to illuminate at a desired color when the current flows through the electrical connector to the LED.

12. The system of claim 11 wherein the ECU is configured to determine an amount of remaining power of a corresponding vehicle and to transmit the control signal to the LED to cause the LED to illuminate at a first color when the remaining power is equal to or greater than a power threshold and the current flows through the electrical connector to the LED, and to illuminate at a second color when the remaining power is below the power threshold and the current flows through the electrical connector to the LED.

13. A system for illuminating a steering wheel of a vehicle comprising:
   a shell at least partially formed in a shape of the steering wheel and having a first layer and a second layer spaced apart from one another;
   a positive triboelectric material coupled to the first layer of the shell and configured to lose electrons in response to friction;
   a negative triboelectric material coupled to the second layer of the shell and configured to gain electrons in response to friction; and
   an electrical connector coupled to at least one of the positive triboelectric material or the negative triboelectric material such that current flows through the electrical connector to an electronic device in response to force being applied to the shell causing the positive triboelectric material to contact the negative triboelectric material.

14. A system for illuminating a steering wheel of a vehicle comprising:
   a base substrate that forms a portion of the steering wheel or a portion of an annular steering wheel cover for the steering wheel;

a light emitting diode (LED) embedded within or attached to the base substrate;

a conductive electrode attached to the base substrate;

a negative triboelectric material in contact with the conductive electrode and configured to gain electrons in response to friction; and an electrical connector coupled to the LED and the conductive electrode such that current flows from the negative triboelectric material through the electrical connector to illuminate the LED in response to contact between the negative triboelectric material and a positive triboelectric material.

15. The system of claim 14 wherein:

the base substrate, the LED, the conductive electrode, the negative triboelectric material, and the electrical connector form a first self-illuminating package; and at least one of the steering wheel or the annular steering wheel cover includes a plurality of self-illuminating packages including the first self-illuminating package spaced circumferentially about the steering wheel or the annular steering wheel cover.

16. The system of claim 14 further comprising a capacitor coupled between the LED and the conductive electrode and configured to increase a time duration of power applied to the LED.

17. The system of claim 14 wherein the negative triboelectric material includes a first negative triboelectric material and a second negative triboelectric material located between the base substrate and the first negative triboelectric material and configured to gain fewer electrons than the first negative triboelectric material in response to friction.

18. The system of claim 14 wherein the negative triboelectric material includes at least one of fluorinated ethylene propylene, poly (4,4'-oxydiphenylene-pyromellitimide), polytetrafluoroethylene, or polydimethylsiloxane.

19. The system of claim 14 further comprising an electronic control unit (ECU) coupled to the LED and configured to transmit a control signal to the LED to cause the LED to illuminate at a desired color when the current flows from the negative triboelectric material through the electrical connector to the LED.

20. The system of claim 19 wherein the ECU is configured to determine an amount of remaining power of a corresponding vehicle and to transmit the control signal to the LED to cause the LED to illuminate at a first color when the remaining power is equal to or greater than a power threshold and the current flows from the negative triboelectric material to the LED, and to illuminate at a second color when the remaining power is below the power threshold and the current flows from the negative triboelectric material to the LED.

* * * * *